April 11, 1961 T. N. LOWRY 2,979,574

SYNCHRONIZATION CHECK CIRCUIT

Filed Oct. 26, 1959 5 Sheets-Sheet 1

INVENTOR
T. N. LOWRY
BY S. E. Hollander
ATTORNEY

SYNCHRONIZATION CHECK CIRCUIT

Filed Oct. 26, 1959 5 Sheets-Sheet 2

INVENTOR
T. N. LOWRY
BY S E Hollander
ATTORNEY

April 11, 1961 T. N. LOWRY 2,979,574

SYNCHRONIZATION CHECK CIRCUIT

Filed Oct. 26, 1959 5 Sheets-Sheet 3

INVENTOR
T. N. LOWRY
BY
S E Hollander
ATTORNEY

INVENTOR
T. N. LOWRY
BY S E Hollander
ATTORNEY

April 11, 1961 T. N. LOWRY 2,979,574

SYNCHRONIZATION CHECK CIRCUIT

Filed Oct. 26, 1959 5 Sheets-Sheet 5

INVENTOR
T. N. LOWRY
BY SE Hollander
ATTORNEY

United States Patent Office 2,979,574

Patented Apr. 11, 1961

2,979,574

SYNCHRONIZATION CHECK CIRCUIT

Terrell N. Lowry, Boonton, N.J., assignor to Bell Telephone Laboratories, Incorporated, New York, N.Y., a corporation of New York Filed Oct. 26, 1959, Ser. No. 848,729

28 Claims. (Cl. 179—175.2)

This invention relates to telephone systems and more particularly to control circuits for two-stage subscriber line concentrating systems.

"Line concentration" or the facilities for connecting a relatively larger number of substation lines to a relatively smaller number of switching paths has been inherent in telephone systems since their inception. In manual telephone switching practice and in prior automatic telephony arrangements the practice has been to extend a direct path from each subscriber (other than a party line subscriber) to the central office, where, in a first switching stage, the lines are "concentrated" before access to the remaining equipment in the central office.

Recent advances in the technology of telephone switching have demonstrated that desirable economic advantages can be obtained by a system which concentrates substation lines at a point which is remote from the central office. In the latter instance, a lesser number of channels or trunks to the central office than the number of subscriber lines is utilized from the point of concentration. In fact, the financial benefits to be derived from reduction of copper costs and other outside plant expenditures by remote line concentration are so significant that this branch of switching development has been spurred to a considerable degree as evidenced by the patent and other literature.

These recent advances in remote concentrator developments have been in large measure made possible by overcoming formidable obstacles in control and supervision of the remote switching equipment.

However, prior art arrangements of the type described, although completely operative, are disadvantageous in a number of essential considerations. For example, in areas of high population density or in areas where the subscriber lines originate at a considerable distance from the central office, a single stage of concentration (which characterizes most prior art concentrators) may be inadequate since the trunks from the central office to the remote point of concentration may, due to traffic considerations, be of considerable number. Also the length of the trunks to the central office from the point of concentration may be excessive.

Moreover, in certain other prior art arrangements, direct-current connections are made from the subscriber lines through the concentrator to the central office for supervisory and signaling purposes. In a two-stage concentrator arrangement, which impliedly includes substantial distances from a particular subscriber to the central office, direct-current connections give rise to a number of serious difficulties. For example, the switching network in the concentrators, i.e., the apparatus for connecting the lower level lines from the subscribers to the higher level links or trunks to the central office, may be subjected to longitudinal currents induced from power lines and other sources of interference. Additional related disorders may result from the effects of cable leakage and differing direct-current earth potentials at the subscriber station and the central office. All of these factors militate against the quality and accuracy of signal transmission.

Certain prior art concentrators operate under heavy control traffic burdens. In this reference "control traffic" refers to the necessary signaling between the locale of concentration and the central office to transmit the required supervisory signals and network order signals that pass in each direction. In some prior art concentrators, it was necessary to signal the central office concerning the state condition of a subscriber line each time the line is examined or scanned at the remote point. In a concentrator of the size proposed herein, this type of arrangement would constitute a grave handicap. In any concentrator, in fact, continuous supervisory signaling of the state condition of the line taxes the control facilities between the point of concentration and the central office. In addition when a particular substation line is requesting service, it has been required, in certain prior art devices, to identify the service requesting unit and transmit the entire identification thereof to the central office.

One arrangement for transcending this obstacle is predicated on a synchronization between a pulse responsive unit or counter at each remote concentrator and a similar local or master counter at the central office. Under these circumstances, when a line is requesting service, reference to the counter at the central office will specifically identify the number of the service requesting line, obviating the necessity for transmitting information representing the identification from the remote concentrator to the central office.

It will be readily appreciated, however, that this type of operation, while operative and useful, may give rise to an even more urgent problem than the one it was designed to overcome. Thus, if the counter in the central office and the counter at the remote location fall out of synchronism by even one unit, the control equipment at the central office will be continuously misinformed as to the designation of the line requesting service. Consequently in a remote concentrator system where a master counter and a number of remote counters are utilized, the maintenance of accurate and synchronous operation of the remote counters with respect to the office counter is of paramount significance.

It is therefore an object of this invention to provide an arrangement for periodically examining the synchronization of the remote counters and master counters.

Another object of this invention is to provide for synchronizing the remote counters with the master counter at two distinct points in the counting cycle.

Still another object of this invention is to provide a synchronism check of remote counters by utilizing facilities which serve the additional purpose of indicating a service request.

An additional object of this invention is to provide alarm facilities operative in the event that any of the remote counters are out of synchronism.

Still another object of this invention is to provide primary and secondary stages of concentration thereby reducing the number of trunks extending from the secondary or final stage of concentration to the central office to an optimal minimum based on traffic considerations.

A further object of this invention is to provide connections between the primary and secondary stages and between the secondary stages and the central office that eliminate or minimize the effects of cable leakage.

An additional object of this invention is to provide connections between the remote concentrators and the central office that reduce the effects of variations in direct-current ground potentials.

Still another object of this invention is to provide for isolating the remote concentrators and the connections to the central office from longitudinal currents induced by adjacent power lines and other sources of interference.

These and other objects of the invention are realized in an illustrative embodiment in which a remote network comprising two stages of line concentration is included. The primary stage which is connected to the subscriber's line includes a full access switch for connecting a maximum of 58 subscribers to 10 links which join the remote primary concentrator to the remote secondary concentrator. The secondary remote concentration stage provides for a maximum of 200 links which are connectable through a partial access switch to a maximum of 100 trunks that join the remote secondary concentrator to the central office. In this respect similarly numbered links from each primary are given access to a particular 10 of 100 secondary trunks.

Both primary and secondary networks are intercoupled through transformers which provide an alternating-current coupling path exclusively with no direct metallic connection between the central office and the subscriber substation. It will be noted in this regard that the lack of a metallic connection between the subscriber station and the central office intensifies the control problem so far as maintaining and verifying the accuracy of the operation of the remote concentrator. Thus, no direct examination of remote equipment at the central office is possible and all information of a supervisory and control nature including all verification signals must be transmitted through the alternating-current coupled networks.

This isolation of the remote concentrators from the central office, although carrying with it a number of material desiderata, renders the synchronization problem more difficult.

These problems are overcome in the present invention as indicated herein.

Both primary and secondary networks may illustratively be single stage one-wire switches employing PNPN transistor crosspoints. Conversion from two-wire to one-wire transmission is accomplished at the transformer couplings. In the present embodiment talking battery is supplied in the primary concentrator and crosspoint holding power is also locally applied. The transformer coupling facilities, of course, isolate the switching networks from the adverse effects referred to above that inhere in the use of continuous metallic transmission paths.

A connection through the remote network is established by selecting an idle path through both stages of concentration. Identifying numbers for the selected link and trunk are then transmitted to the remote concentrators with a "mark" order. Since the line number requesting service is available from the line counter in the primary, both ends of each end marked stage of the remote primary and secondary networks are sufficiently specified.

The remote network is released from the link side of the remote primary concentrator and the trunk side of the remote secondary concentrator. Complete records of each connection are stored in a temporary route memory and thus the identification of the link and trunk to be disconnected is readily available.

Closures and releases in the remote primary and secondary concentrator networks as well as failures are systematically recorded to the central office.

In one aspect of the present invention the lines and links are scanned on a periodic basis. Scanning includes arrangements for detecting service requests, answers and disconnects. A line number counter at each remote primary is stepped one position at a time in conjunction with the line scanner. A master counter in the central office is also stepped in unison with the counters at the remote primaries.

Since a line exhibiting a supervisory state indicating a change condition is identified by reference to the office counter and since scanning and marking of the remote primary etwork are dependent on the remote primary line number counters, it is, of course, vital that the remote counters and the master counter in the central office operate synchronously.

In the instant invention the arrangement for detecting counters which are out of synchronism includes a control signal from the central office directing a synchronism check. This check is performed at two points in the counting cycle and if the check is successful a spurious service request indication is forwarded to the central office. If all primary concentrators forward a service request to the central office the check is successful and the synchronism check circuit is reset for subsequent operation. If the check is unsuccessful, i.e., at least one of the remote primary concentrators fails to transmit a spurious service request, the remote primary concentrator which is malfunctioning must be identified. To accomplish this the service requesting indication facilities in the central office are examned by a scanner located at the central office to determine which of the facilities fails to indicate a service request. In this manner the primary concentrator which failed in the synchronism check is identified.

In the event that the operation of the synchronization check circuit indicates a failure of synchronism between the remote counters and the central office counter additional equipment at the central office is utilized to transmit an order to the malfunctioning remote primary to resett he counter thereat.

When the primary concentrator counter is reset, all of the service request indicating facilities are reset in a manner equivalent to that for a successful synchronization check.

However, a record is made in a special register of the primary counter which has been discovered to be functioning incorrectly. On the next synchronization check (made periodically) equipment in the central office refers to this register and if it is determined that another failure occurred for the same primary, facilities in the central office are energized to inhibit or suppress any signals from that remote primary concentrator. This action effectively blocks any signals from the remote primary concentrator to the central office. In addition the service request indicating facility at the central office connected to the malfunctioning primary concentrator is forced into a service request condition to thereafter generate an apparent synchronism agreement for later synchronism checks even though it has already been established that a failure of synchronism obtains. It has facilities were available to force the remote concentrator into apparent synchronism agreement on later synchronism checks, the subsequent tests would continue to indicate the failure although it has already been recorded.

If a successful synchronism check had been obtained on a second trial for a remote primary counter which has already once malfunctioned, the circuit would be reset, the record erased and subsequent operations would be normal.

A feature of this invention is an arrangement for detecting a lack of synchronism between a remote counter and a counter located in the central office.

An additional feature of this invention includes means for performing synchronization checks between local and remote counters on a periodic basis.

A further feature of this invention includes equipment for generating a false or spurious service request at the remote primary concentrator if a synchronism agreement is made.

Still another feature of this invention includes arrangements for checking the synchronism of local and remote counters at a number of points in the counting cycle.

Still another feature of this invention includes means for detecting the identification of a counter which is operating incorrectly by examining for a lack of a fictitious service request from the associated remote primary concentrator.

Still another feature of this invention includes means for recording the identity of a remote primary line number counter which has failed in the synchronism check.

An additional feature of this invention includes arrangements for forcibly resetting all of the service request indicating facilities at the central office after a synchronism check failure.

A further feature of this invention includes equipment for attempting a second synchronization check after a first has proved unsuccessful.

An additional feature of this invention includes arrangements for resetting a remote concentrator primary line number counter which has failed in a synchronism check to the correct count.

An additional feature of this invention includes equipment responsive to a successful synchronization check after a previous failure to check to reset the apparatus for normal use thereafter.

Still another feature of this invention includes facilities responsive to a second unsuccessful synchronization check to suppress signals from the remote primary concentrator concerned.

A further feature of this invention includes arrangements responsive to a second unsuccessful synchronization check to force the service request indicating facilities at the central office associated with the malfunctioning primary concentrator to a state which will thereafter generate an apparent synchronism agreement.

An additional feature of this invention is a checking arrangement adapted to have the periodicity thereof established at the central office without requirements for adjustment or timing facilities at the remote concentrator. In view of the noise restrictions attendant upon the use of phantom channels on speech circuits, it is inappropriate to transmit a spurious service request in response to a synchronization check from the remote primary to the central office on every scan cycle. To preclude the necessity of equipping each remote primary concentrator with a special timer or counter for initiating a synchronization check, this timing function has been relegated to the central office equipment.

These and other objects and features of the invention may be more readily comprehended from consideration of the following detailed description together with the drawing, in which:

Fig. 1 shows a portion of the remote primary concentrator of one illustrative embodiment of my invention;

Fig. 2 generally shows equipment in the secondary concentrator for this illustrative embodiment;

In disclosing the present invention a general description of a suitable two-stage concentrator system in which the present invention is embodied will be given followed by a detailed description of the operation of the present invention in combination with the two-stage concentrator.

For purposes of clarity of presentation only those portions of the concentrator system which are essential to a comprehension of the present invention have been disclosed in detail. For an explanation of the operation of the two-stage concentrator and the equipment omitted in the present disclosure reference may be made to an application of Harr-Lowry-Nehama-Ridinger, Serial No. 848,595, filed on even date herewith and the applications therein referred to. In most instances the same reference designations have been employed in both cases. In addition, for an explanation in detail of the operation of the scanner, detector and related equipment, reference may be made to an application of Cirone-Harr-Lowry-Ridinger, Serial No. 824,924, filed July 1, 1959, all of which applications are herewith incorporated by reference.

I. GENERAL DESCRIPTION

(A) *Introduction*

Figure 6:
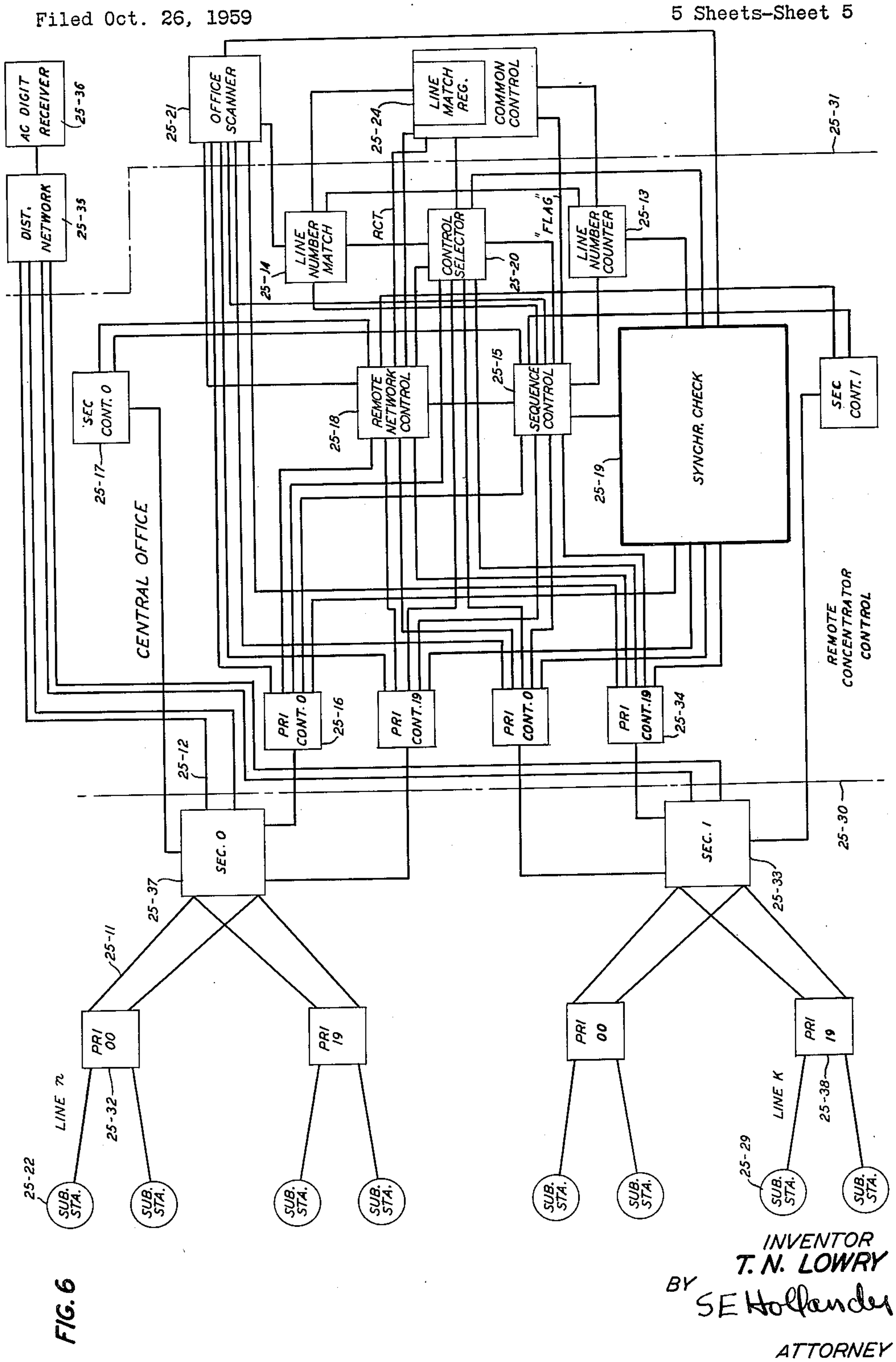
Fig. 6 is a block diagram of an illustrative two-stage concentrator system in which the present invention may be advantageously incorporated.

Referring now to Fig. 6 it may be observed that a number of substations 25–22, 25–23, etc., are connected over lines to the primary concentrators 25–32, 25–38, etc. and in turn the primaries are connected over links 25–11 to the secondary concentrators 25–37 and 25–33. From the secondaries a number of trunks 25–12 extend to the distributive portions of the switching network in the central office explained in greater detail herein.

In Fig. 6 the remote equipment is indicated to the left of line 25–30 and the equipment within the central office to the right of line 25-30. The equipment between lines 30 and 31 constitutes the remote concentrator control, sometimes hereinafter referred to as RCC.

The over-all arrangement of the two-stage concentrator is based on a synchronous control system. Each of the lines is examined sequentially under control of a counter (not shown) at the remote primary. A master counter 25–13 at the central office is stepped in synchronism with the counters in the primaries. The line number counter 25–13 at the central office serves all of the counters in the remote primaries within a single group of concentrators. It is understood, however, that in a large central office several groups of concentrators may be required. In this event an individual line number counter (25–13) is provided for each group. Although synchronism obtains between each line number counter 25–13 and the remote counters which it serves, there is no necessity for intergroup synchronism.

The advantages which inhere in the use of a synchronous control system include the facile manner of identifying a customer making a service request. In asynchronous or other arrangements when a customer initiates a service request, it is necessary for the remote primary concentrator to forward information indicating the identity of the customer. By contrast, in the present arrangement it is essential only for the remote primary concentrator to forward control information to the central office indicating a service request. At the central office control equipment will examine the line number counter to identify the number of the line at the remote primary requesting service.

Since the over-all arrangement is sequential in nature, i.e., the remote counters are stepped one position at a time, the stepping speed is partially fixed by the transmission characteristics of the telephone cable extending the lines to the central office. Illustratively, a nominal time of 2 milliseconds has been allowed to transmit the advance pulse and wait for a reply control signal. Thus 500 pulses per second is the basic stepping rate.

As indicated in the application of Harr et al., Serial Number 848,595, filed on even date herewith, the concentrator control system in the central office has been provided with sufficient intelligence to properly administer and evaluate control pulses transmitted to and from the remote points without burdening the central office common control system with any but the most critical situations.

In this respect it may be observed that the basic repetition rate of the common control system for a switching system suitable for use in conjunction with the present invention (such as that shown in an application of Budlong-Drew-Harr, Serial Number 688,386, filed October 7, 1957) is 2 microseconds and in consequence the stepping rate of the concentrator, which is 2 milliseconds, represents merely an occasional occurrence rather than a frequent one for common control. To some extent the two-stage concentrator system is autonomous in the central office and makes independent decisions calling in common control only when higher priority decisions are required.

(B) *Description of major components*

(1) SEQUENCE CONTROL

The sequence control 25–15 generally designates equipment which decides when it is necessary to send advance pulses to step the counters at the remote primaries.

Thus a typical decision by the sequence control circuit 25–15 is that no control pulses have been received from the primary concentrators indicating service requests, etc., and it is feasible to continue stepping and generating advance pulses. The sequence control circuit includes a timing circuit adapted to measure an elapsed 2-millisecond interval and to observe whether any reply control signals have been received. If no service requests are received, the sequence control on its own initiative continues to step all of the counters in the remote primaries sequentially without assistance from the common control.

(2) LINE NUMBER MATCH

The line number match circuit 25–14 has the general function of permitting the line number counter 25–13 to be stepped at a number requested by common control. If common control requires the line number counter to step at a particular number, it stores the wanted number in the line match register 25–24. The match logic circuit 25–14 includes comparator arrangements adapted to compare a number stored in the common control line match register 25–24 with the number appearing in the line number counter 25–13. At each step that the counter 25–13 takes the sequence contol circuit 25–15 is informed as to whether a match condition has been requested and exists.

Thus if the line number counter is at line 10 and the line number match is looking for a match at 15, until the counter arrives at number 15, the line number match 25–14 will not provide a signal to the sequence control 25–15 which therefore continues to send out advance pulses to step all the counters. When line number 15 is reached, the match circuit 25–14 observes that the counter 25–13 is at the number that the common control is seeking and will produce an indication in the sequence control 25–15 which causes the sequence control to stop transmitting advance pulses and thereby to bring the counters in all the remote primaries to a halt.

(3) "FLAG"

At this time the sequence control 25–15 provides an indication to the common control over a "flag" lead. The flag lead is a vital link between the concentrator control and common control since all information proceeding from the concentrator to common control is introduced by the flag lead. Common control examines the flag lead at periodic intervals as explained herein to observe if a flag indication is made.

When the sequence control 25–15 sets the flag no further independent action by the concentrator can proceed and all concentrator operations stop. Physically, as will be indicated herein, the "flag" is a flip-flop in the common control circuit.

(4) PRIMARY CONTROL

The primary controls designated generally as 25–16 and 25–34 are control circuits in the central office which are individually connected to each of the remote primary concentrators and, in effect, are terminals of signaling circuits which extend to the remote primary. The function of the control circuits is to receive and transmit information to and from the remote primaries using control pulses appropriate to the purpose. For example, when primary 00 (25–32) sends a control signal pulse representing a service request to the central office this signal will be received, over link 25–11 and additional signaling channels, in primary control 25–16 where it will be stored in a flip-flop. The primary control 25–16 also serves to provide control signals in an outgoing sense from the central office to a specific remote primary. Primary control 25–16 is, in effect, therefore, a signaling terminal for two-way transmission.

The common control equipment in the central office comprehends by reference to the particular primary control circuit indicating a service request, which of the forty remote primaries has initiated the request.

Thus, if the line number counter is at a count corresponding to line 35, and if at this time a service request corresponding to one of these lines in one of the primaries is made, it is insufficient for identification purposes to observe merely that line 35 is energized since that line may appear in any one of the forty primaries indicated in Fig. 6. However, common control by reference to the particular primary control 25–16, etc., in which the service request has been registered can deduce which of the primaries contains the line requesting service.

(5) SECONDARY CONTROL

The secondary control 25–17, etc., is related to the remote secondary concentrators in a manner which is analogous to the relationship between the remote primaries and the primary controls 25–16, etc. Secondary control 25–17 is thus, in effect, a signaling terminal. It contains equipment for transmitting control signals to the remote secondaries. This equipment includes facilities for shaping the control pulses transmitted to the secondaries and additional apparatus for receiving control pulses from the secondaries.

(6) REMOTE NETWORK CONTROL

Remote network control 25–18 is utilized by the common control as an intermediary in transmitting information to the remote primary and secondary concentrators.

In view of the high repetition rate in common control in relation to that of the remote concentrator control (RCC) adverted to above, information delivered from the common control to RCC is delivered in parallel rather than in series. The function of remote network control 25–18 is to take information transmitted in parallel binary form from common control and convert it to control signals suitable for the remote primaries and secondaries. In addition, the remote network control 25–18 discerns which pulses must be transmitted at high speed over direct paths and which control information can be transmitted at slow rate over phantom channels as explained herein.

Control 25–18 is utilized only when a specific order is to be executed by the remote switching networks and has no direct bearing on supervision of line circuits. When no supervisory changes are taking place in the lines the remote network control 25–18 is quiescent.

(7) SYNCHRONISM CHECK

The synchronism check circuit 25–19 is charged with the respsonsibility of insuring synchronism between the line number counter 25–13 at the central office and the counters in the remote primaries.

Check circuit 25–19, to perform its assigned function, must be extended to the remote line counters over the primary controls 25–16, etc. A synchronism check is only provided when common control orders it. For example, at intervals of about 5 seconds a program in the common control may order a synchronism check by synchronism check circuit 25–19. The check circuit 25–19 sends pulses to all remote primary concentrators signifying a preparation for check of synchronization. At a prescribed interval thereafter the primaries send a reply in the form of a service request to the central office. If all replies from each of the primaries are delivered back to synchronism check circuit 25–19, no further action is taken. However, if any of the primaries fail to reply the synchronism check 25–19 delivers a signal to the sequence control 25–15 which in turn energizes the flag (Section 2C supra) to the common control signifying a failure. Thus the synchronism check 25–19 consults common control only when a failure has occurred. If a favorable check is made no further action is necessary.

The synchronism check circuit 25–19 makes possible an observation that the line number counter itself may be at fault at which time the remote counters in the primaries will all differ from counter 25–13. Thus, in a situation where the check circuit 25–19 determines that each of the primary counters is out of step with counter 25–19 it inferentially signifies that the counter circuit 25–13 itself is at fault since it is highly unlikely that all of the remote primary counters will coincidentally malfunction.

(8) CONTROL SELECTOR

The control selector 25–20 performs the local control functions necessary to control the RCC. It is used to set and reset flip-flops at specified locations within the remote concentrator control circuits under the supervision of common control. For example, when common control elects to inform the RCC equipment that a service request has been fulfilled and therefore the flip-flop representing the service request must be reset, it does this by energizing the control selector 25–20 which in turn resets the specific flip-flop.

By contrast, the remote network control 25–18 cannot affect local control equipment but only that equipment which is remote. In essence the control selector performs a local function in governing the action of control equipment in the central office which is not sufficiently critical to justify a direct bus connection to the common control.

As a further illustration, when common control elects to send instructions to remote network control 25–18 it prepares a parallel binary number which is gated into control 25–18. This information is sufficient to perform the necessary switching functions. However, due to logical circuit design considerations it is inappropriate for remote network control 25–18 to immediately perform functions based on the receipt of a parallel binary number from common control since the parallel digits may not arrive at precisely the same time. Instead, the information is gated into remote network control 25–18 in parallel, and time is permitted to elapse to insure full registration of all of the binary information. Subsequently, a gating signal will be supplied to remote network control 25–18 to start transmitting the information stored therein. The latter gating signal is supplied by common control through control selector 25–20 to remote network control 25–18.

It is therefore unnecessary to establish an inflexible time relationship between the RCC and common control.

(9) OFFICE SCANNER

The office scanner 25–21 is a scanner which examines directly connected (unconcentrated) substation lines and is not related to the scanning equipment at the remote primaries. The function of that portion of the office scanner 25–21 which is associated with remote concentrators is to examine the primary controls 25–16, etc. and certain other flip-flops within the RCC to observe the particular signal information stored therein.

The points examined by office scanner 25–21 include such terminals as the supervisory registers or flip-flops in primary control 25–16 which indicate service request, hangup or answer conditions. Similar flip-flops in the sequence control 25–15 which indicate the motivation for a specific flag condition may be scanned by scanner 25–21. In this sense, office scanner 25–21 is treated as a part of common control for the purpose of advising common control as to the causes for flag signals delivered to common control. It is significant to observe that although office scanner 25–21 may scan direct lines, as explained herein and in the application of Budlong et al. supra, it cannot perceive information about a specific remotely concentrated line. Its reach extends only as far as the RCC.

Thus the office scanner may see an indication of a service request in primary control 25–16 but this is not uniquely identified wtih a particular subscriber's line. In short, the office scanner supplies information to the common control about the concentrator system generally but not in relation to a particular remotely concentrated line. All of the individual line scanning is done in the remote primaries as will be explained infra.

(C) *General description of typical call*

(1) OFF-HOOK CONDITION PRECIPITATES SERVICE REQUEST

When subscriber 25–22 (connected to line *n*) goes off-hook the scanner (not shown) in the remote primary will observe the service request when the counter advances to line number *n*. A pulse signifying a service request is sent by the remote primary 25–32 over phantom channels which go directly to primary control 25–16 at the central office. Although these phantom channels are geographically routed through the remote secondary 25–37, the remote secondary performs no useful function with regard thereto. When the service request pulse arrives in primary control 25–16 it sets a flip-flop signifying this condition. This in turn produces a flag indication to common control via sequence control 25–15 and at the same time governs sequence control 25–15 to discontinue the train of advance pulses. Accordingly, all local activity in the RCC is halted.

The service request pulse at the primary was initiated in view of the scanner having arrived at a terminal (connected to line *n*) signifying a service request and the subsequent arrival of an advance pulse at the remote primary.

It is understood, of course, that service requests or other supervisory indications may be present in other lines and registered in the corresponding primary controls. The result is the same, i.e., producing a flag indication for common control.

(2) ORIGINATING CONNECTION TO CALLING CUSTOMER

After determining that it is a genuine service request the first major function of common control is to provide a connection between the central office and the calling substation in order that the subscriber may key the digits of the called number. Common control by reference to a memory selects an appropriate route to effect the connection which may illustratively include link 25–11 and trunk 25–12 and delivers this information to remote network control 25–18 after recording it in the memory. The instructions from common control to remote network control 25–18 dictate that link 25–11 and trunk 25–12 be utilized to effect the connection. Having given this information to remote network control 25–18, common control dictates to the control selector 25–20 that it energize network control 25–18 to start sending the necessary control impulses to effect the connection. Once energized, network control 25–18 proceeds under its own initiative for approximately 15 milliseconds to transmit the information. It operates on the information conveyed from common control to deliver the appropriate control intelligence to both the remote primary 25–32 and the remote secondary 25–37 through the terminals of primary control 25–16 and secondary control 25–17.

It may be observed at this time that it is unnecessary to transmit through network control 25–18 the line number of the calling line since when the counter arrived at the line having a service request it conditioned a line selector (not shown) in remote primary 25–32 to provide a connection to that line as explained herein. The counter thus addresses the line scanner and the line network control selector simultaneously.

The only path information that need be transmitted by network control 25–18 is a one-out-of-ten indication for the links and one-out-of-ten indication for the trunks. This follows since the numbers of the links and trunks bear a predetermined relationship, e.g., if the link 9 were the selected link for the remote primary concentrator then trunks 90 to 99 would be available in the remote secondary concentrator.

After the control selector 25–20 has been actuated by common control to initiate operation of the remote network control 25–18, the control selector prepares a path to reset the flag condition originated by sequence control 25–15.

It may be observed that remote network control 25–18 is connected to sequence control 25–15 to insure that when network control 25–18 is transmitting the information stored therein by common control, the operation of sequence control 25–15 is arrested to prevent any further advance pulses. Thus, when the flip-flop (not shown) indicating the service request was reset in primary control 25–16, the flag indication is not released since sequence control 25–15 is now inhibited by remote network control 25–18 from transmitting further advance pulses until network control 25–18 completes its transmission function.

However, when common control actuated sequence control 25–20 to energize network control 25–18, the flag in sequence control 25–15 is removed since it would be inefficient for common control to observe a flag and not be able to seize remote network control 25–18 for the purpose of effecting the necessary connections. Therefore, whenever remote network control 28–18 is operative the flag indication to common control is inhibited.

Since the flag was removed when remote network control 25–18 was energized and the service request flip-flop in primary control 25–16 was reset by control selector 25–20, sequence control 25–15 can return to its primary function of generating advance pulses as soon as remote network control 25–18 has completed transmission of the order information stored therein. In the interim, the entire concentrator system remains motionless for approximately 15 milliseconds until network control 25–18 completes its function.

The customer at substation 25–22 is now provided with a path through the remote primary and secondary concentrators to the central office. These crosspoints (as shown herein) are much faster in operation than the control pulses which energize them. In consequence, when network control 25–18 has completed its function the circuit is already established. Common control now actuates the central office distribution network 25–35 to effect a connection between trunk 25–12 and a digit detector 25–36 which can receive alternating-current dial pulses.

A connection is now established between the customer at substation 25–22 and the digit detector 25–36 which latter transmits dial tone to the calling subscriber. The subscriber keys the desired called directory number into the digit detector 25–36 which transfers it to common control.

The sequence control 25–15 is automatically reenergized if no other flag-producing conditions exist and resumes transmission of advance pulses. Common control through its own program makes the necessary translation from the received directory number digits to establish the terminating station equipment number. In the assumed illustration the common control will arrive at a translation representing the equipment number of called substation 25–23. Preparations are now made to establish a terminating call to that station.

(3) TERMINATING CONNECTION TO CALLED CUSTOMER

As a result of the translation, information pertaining to the concentrator group number, secondary number, primary number and line number of the called station will be obtained. Common control now selects the line number and gates that number into a register within common control referred to as the line match register. This number is a six-bit binary number corresponding to line number $k$. Common control arranges for the line number counter 25–13 to stop at a number equivalent to line number $k$. This is necessary since the network selector (not shown) in the primary is controlled by the line number counter in the primary.

Having stored the six-bit number in the line match register 25–24, common control now directs control selector 25–20 to regulate line number match 25–14 to effect a match between the number stored in the line match register 25–24 and that stored in line number counter 25–13.

A match is effected between the number stored in the flip-flops of the line match register, as explained in detail herein, and the number stored in the line number counter 25–13. The necessity for advising control selector 25–20 to initiate a specific match is that line number match 25–14 will constantly be producing match conditions between a number (which always remains) in the line match register 25–24 and the number stored in the line number counter 25–13.

When the counter arrives at the number representing line number $k$ after an average waiting time of approximately 60 milliseconds, an output is produced in line number match 25–14 and delivered to sequence control 25–15 which will send a flag indication to comomn control. Again the entire concentrator system remains static until common control observes the flag indication. In this respect it may be noted that each time common control observes the flag, it must determine how the flag indication was created and whether this particular flag indication is related to a previous indication or represents an entirely new situation.

To identify the origin of the flag indication, common control directs the office scanner 25–21 to proceed through its scheduled scanned cycle described above. The office scanner 25–21 informs common control that a match has been effected. In this case office scanner 25–21 is physically observing a flip-flop in line number match 25–14 signifying a match condition as described in detail herein.

Common control refers to its memory wherein there was previously stored the translated number signifying the equipment designation of substation 25–23. In addition common control determines from the switching memory whether the called station is recorded as a working number for any other connection. This is, in effect, a busy test. If the busy test indication is positive, calling substation 25–22 is given a busy tone, the match condition is cleared and the concentrator system disregards the call entirely and proceeds on its regular cycle.

If substation 25–23 is not listed in the switching memory as being active, it is presumed to be idle. There is still a possibility, however, that substation 25–23 might have gone off-hook during the last cycle of the line scanner. Information to this effect must be acquired by common control to prevent ringing while the customer has the subset to his ear. Just before the connection is established for the terminating portion of the call the office scanner 25–21 is advised to make a directed scan, i.e., not to proceed through all of the usual supervisory points but to proceed directly to the service request output of the primary control for the subscriber being called. If a service request is detected the call is nevertheless completed but no ringing takes place.

If the line 25–23 is still on-hook, however, common control examines its switching memory to select an appropriate link and trunk for the connection. Once the decision is arrived at it records the allocated link and trunk in the switching memory and sends corresponding information to remote network control 25–18. A further signal is delivered to control selector 25–20 to initiate transmission of signaling by remote network control 25–18.

Common control now resets the flip-flop in line number match 25-14 which created the flag condition. When remote network control 25-18 completes transmission of the information stored therein, sequence control 25-15 is permitted to resume transmission of advance pulses and the RCC returns to its usual cycle. In the interim, common control has instructed the distribution network 25-35 to establish a ringing connection to the called substation 25-23 in the manner explained in the application of W. A. Budlong et al. supra.

II. DETAILED DESCRIPTION OF OPERATION OF SYNCHRONIZATION CHECK CIRCUIT

In the present arrangement, synchronism is checked only when common control dictates. The check makes use of the transmission of a service request signal at a time when a service request due to traffic is not expected. The basic operation involves transmission to all concentrators in broadcast form of a signal to check the counter position in the remote primaries, and transmission back of a positive signal if agreement is indicated. A single check of only one line number would be inconclusive since a remote counter may be jammed at that number. In consequence a two-point check is used.

The two-point check involves a request at one instant in time and a reply at a separate instant in time. This reply will not occur at the correct time unless the counters are in synchronism.

This type of check is also useful as a "still alive" indication for a remote primary. Since it is possible that a remote primary may go for an extended length of time without generating any service requests or other traffic the periodic synchronism check is a useful expedient in determining continued satisfactory operation.

Referring now to Figs. 1-4, a synchronism check is initiated by a request from common control via the control selector providing an output on lead JE2. This sets flip-flop 23-11, Fig. 4, which in turn drives amplifier 23-12 to provide one of the two inputs to AND gate 23-13. An additional input is provided over lead GE2 which is connected to the line number counter. Lead GE2 carries a pulse signal at the end of each counting cycle as explained in the above-referred-to application of Harr et al. The output of AND gate 23-13 indicates that common control has requested a synchronism check and that the central office line number counter is properly positioned (00) for the beginning of a checking routine. AND gate 23-13 via amplifier 23-14 provides inputs to binary cell 23-15 and flip-flop 23-18.

Setting of flip-flop 23-18 indicates that a synchronism check is now in progress. Binary cell 23-15 has two outputs at amplifiers 23-16 and 23-17 which signify "test phase 1" and "test phase 2," respectively.

Since the request flip-flop 23-11 is set, the next time the counter passes through 00 a pulse is delivered from AND gate 23-13. At this time binary cell 23-15 is driven to the test phase 1.

The output from amplifier 23-16 is a lead designated EH2 which is connected to the sequence control circuit. Lead EH2 permits interleaving a positive synchronism check pulse among the usual negative advance pulses as explained in detail in Harr et al., supra.

Figure 1:
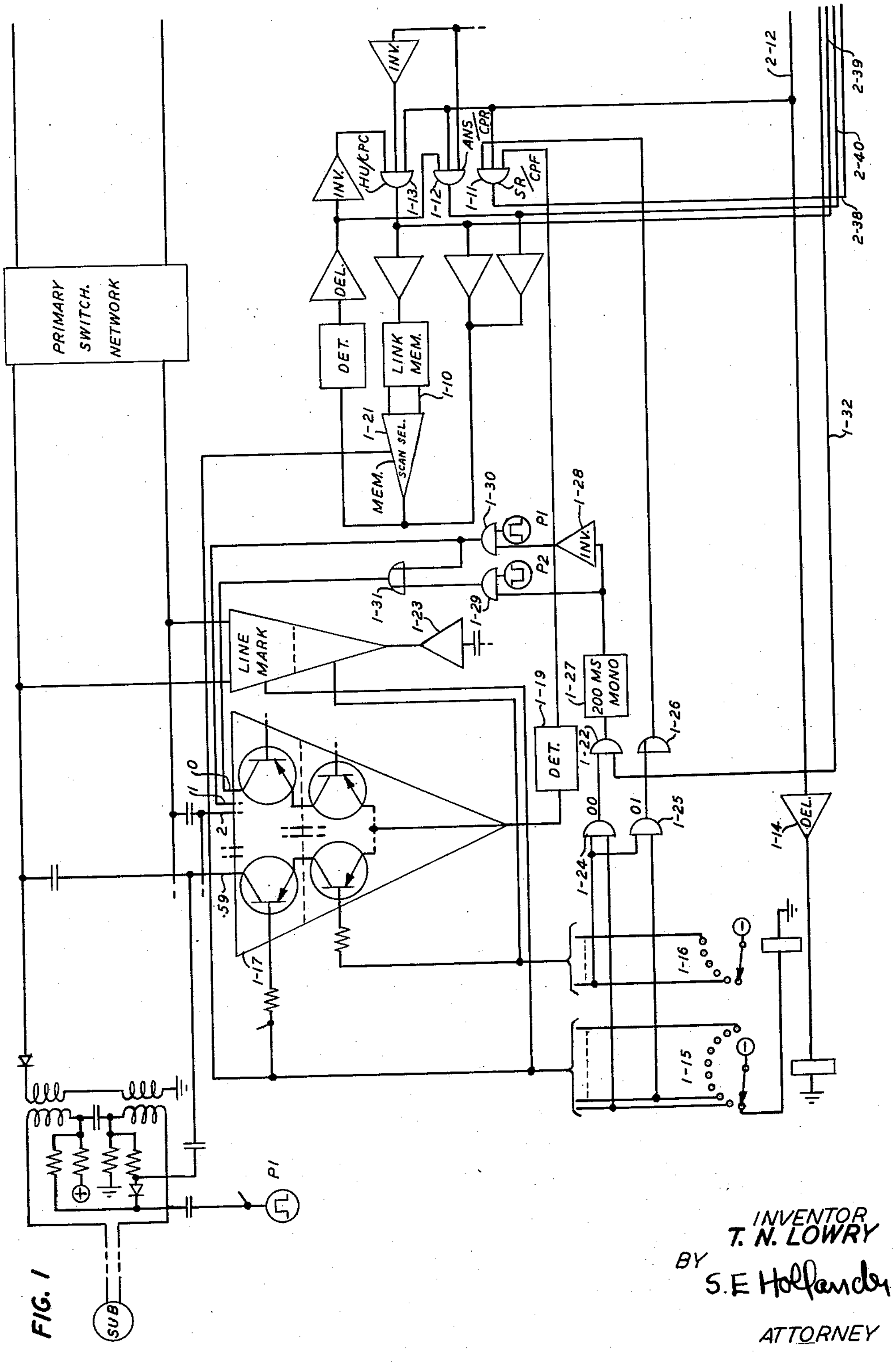
Figure 2:
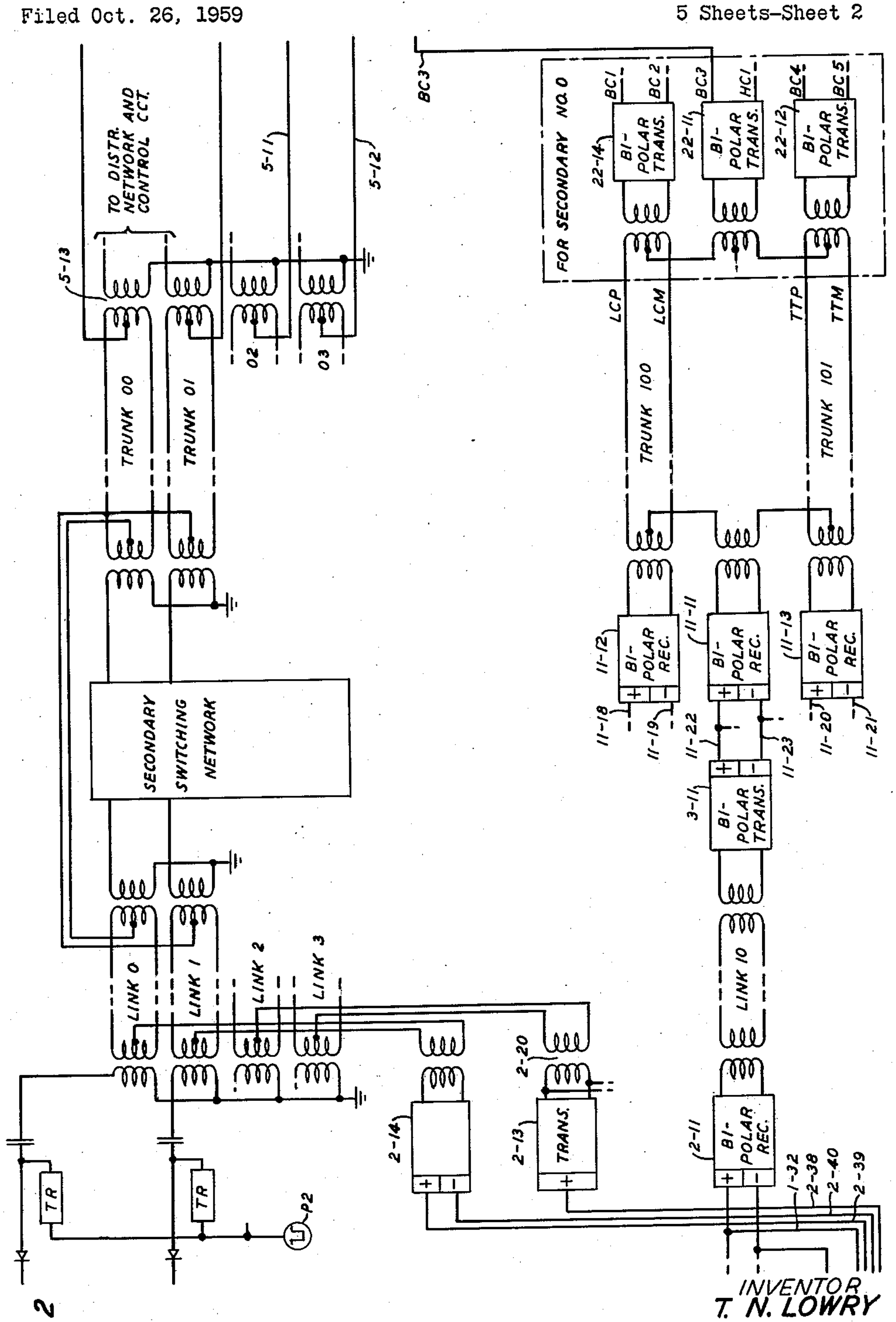
Figure 3:
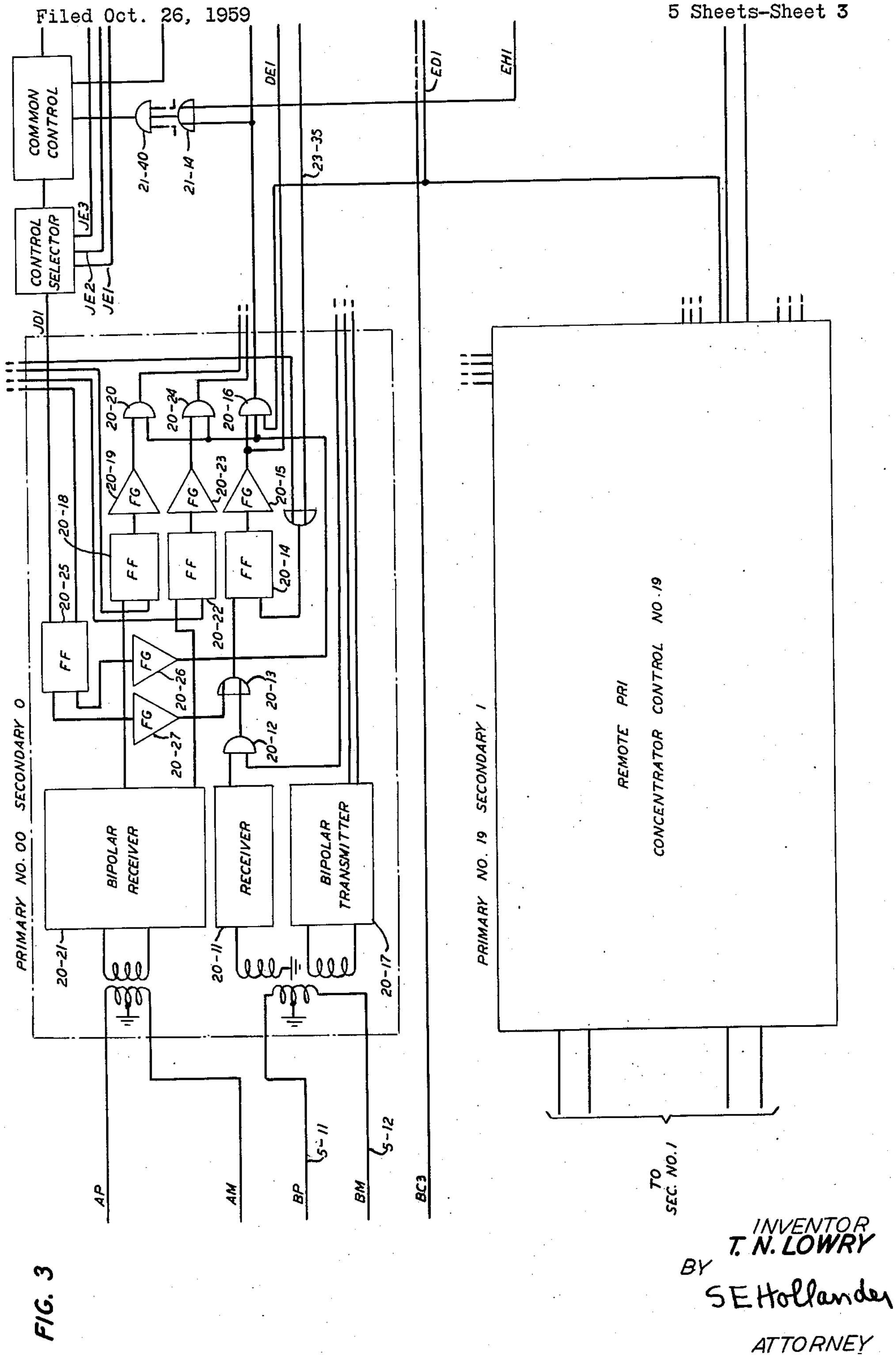
Figs. 3 and 4 show equipment in the central office for this illustrative embodiment.
Figure 4:
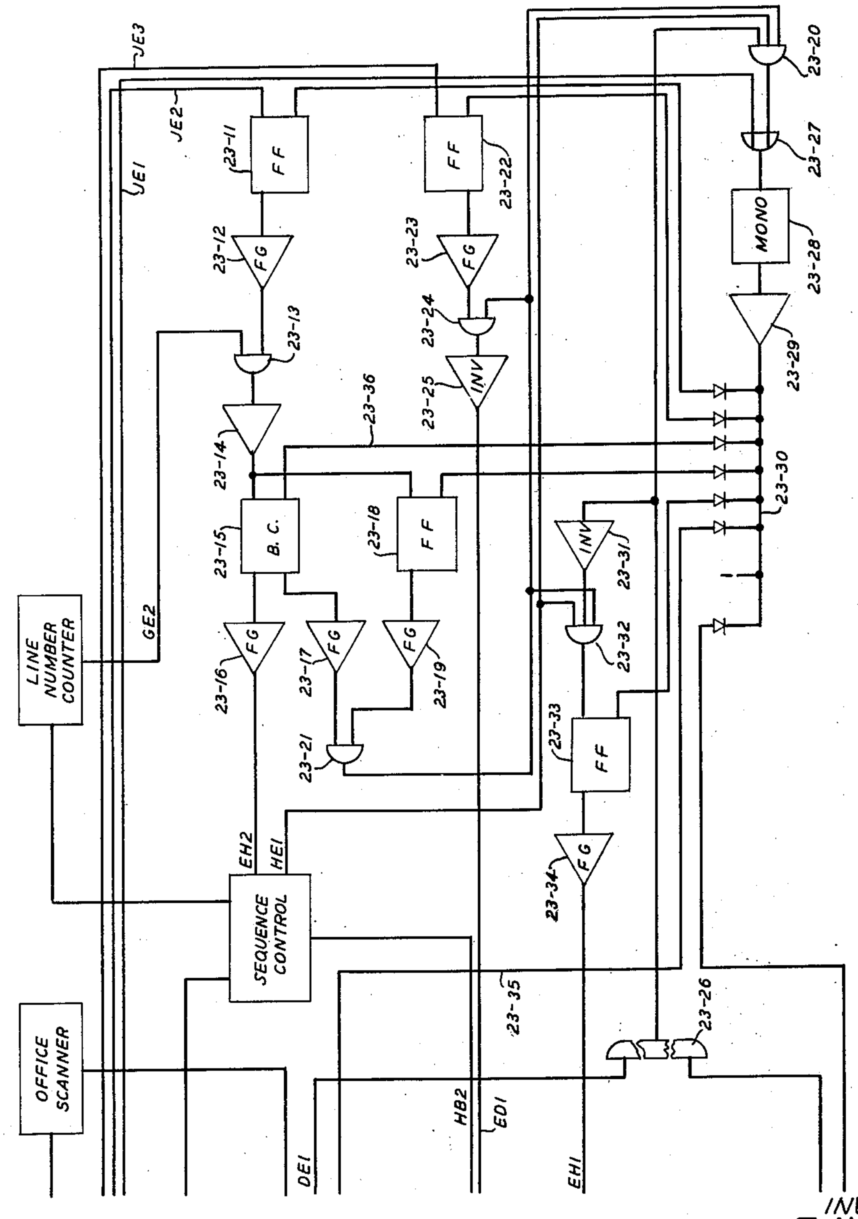
Figure 5:
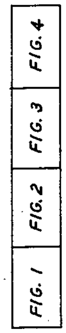
Fig. 5 illustrates the advantageous disposition of Figs. 1 to 4 to disclose this embodiment of my invention.

The positive synchronism check pulse is transmitted over lead HB2 (and logical equipment not shown herein, but shown in detail in Harr et al.) and is transferred via lead BC3 through bipolar transmitter 22-11, Fig. 2, from which it is broadcast to all secondaries and all primaries in the manner explained for the advance pulse, supra.

Taking the case of primary 0, secondary 0, the signal eventually appears in receiver 2-11, and extends to AND gate 1-22 over lead 1-32.

AND gates 1-24 and 1-25 are utilized to produce a specific output at a particular number on the counters 1-15 and 1-16 and at no other time. Thus AND gate 1-24 produces an output for the duration of time slot 00 and AND gate 1-25 produces an output for the duration of time slot 01.

If the positive pulse which arrives over the signaling channel coincides with the output from the gate 1-24, gate 1-22 will be enabled.

This indicates that if the synchronism check pulse arrives at the remote concentrator and the concentrator is at that time at slot 00, the first check point has been verified. In this instance the two inputs to AND gate 1-22 from AND gate 1-24 and over lead 1-32 are activated and monostable circuit 1-27 is energized.

After the first calibration point has been validated and monostable circuit 1-27 is energized, inverter 1-28 deactivates AND gate 1-30. In this respect the output of AND gate 1-30 will ordinarily be a train of P1 pulses which extend to line scanner 1-17, line circuit 0 as explained in the above-referred-to application of Cirone et al. When inverter 1-28 is energized, however, AND gate 1-30 is disabled and the P1 pulses cannot traverse the AND gate. Thus for a space of 200 milliseconds, no P1 inputs appear at the 0th input to line scanner 1-17. For this duration of time when the scanner examines line 0 it will in effect read a service request condition as explained in the application of Cirone et al., supra.

The mod 10 counter 1-15 is the units counter of a 60-step counter driven directly by the advance pulses. Each time the mod 10 counter passes through 0 a single pulse is delivered to the mod 6 counter 1-16. The line counter is shown symbolically as a stepping switch and may take any suitable form.

Scanner 1-17 is illustratively a two-stage transistor tree but may take any suitable form. For example, in the first stage of the tree, six transistors may be provided and in the second stage of the tree sixty transistors may be provided. The purpose of scanner 1-17 is to provide a temporary connection between the sixty inputs (one from each line to be examined) to the scanner and detector 1-19 and any appropriate circuit may be employed for this purpose.

The line mark selector 1-18 may be similar in structure to the scanner and functions to place marking or controlling voltage on the primary switching network shown in outline form and explained further in the Harr et al. application supra. At the same time the line mark selector 1-18 is being brought into usable proximity with the corresponding terminals of the network representing a line being scanned, the counter indicates the number designating that line and the scanner is examining the next succeeding line number. It may be noted in this regard that to address the line mark selector 1-18 to a particular line the entire system is driven to the number representing the line to be addressed.

When the counters 1-15 and 1-16 reach 0, scanner 1-17 is reading line 1. Thus, although monostable amplifier 1-27 is energized during the 0th time slot a service request is not produced since the scanner has stepped beyond position 0. Instead, the service request is detected at the end of the scanning cycle. (In this explanation it is understood that numbers 0 and 1 are reserved for checking purposes and cannot be assigned to customers.)

Referring again to Fig. 4, when the office line number counter reaches the reset condition and a pulse is produced as an input on lead GE2, the binary cell 23-15 is reset to indicate the second phase of operation. Outputs are now provided at amplifiers 23-17 and 23-19 and are combined in gate 23-21. The output from AND gate 23-21 extends to AND gate 23-20.

AND gate 23-26 has inputs which extend from the service request flip-flops of all the primary concentrators in the RCC. Thus, for example, an output from service request flip-flop 20-14 extends over lead DE1 to AND gate 23-26.

When the synchronism check circuit enters the second phase, service requests from all of the remote primaries are expected. It will be remembered that the 0th input at scanner 1–17 is ready to indicate a service request when the pulse which corresponds to a service request is read out by the advance pulse which steps the scanner to 0 on the next cycle. The 0th input is actually scanned when the counters 1–15 and 1–16 are reading position 59. At this time (when the counter is reading 59) the service request indication is prepared in detector 1–19 and is read out by the next advance pulse over gates 1–11 and transmitter 2–13. The service request arrives in the office in the usual manner to set flip-flop 20–14 in the 0th time slot. Thus, the output from flip-flop 20–14 appears as one input from amplifier 20–15 and lead DE1 to AND gate 23–26. Similar signals are received over corresponding channels for the other remote primary concentrators. The output of AND gate 23–26 indicates, if a "1," that all primaries are operating satisfactorily and, if a "0," that at least one primary has failed to transmit its service request.

Assuming that the output of AND gate 23–26 is a "1" it may be traced as one input to AND gate 23–20. The other inputs to AND gate 23–20 extend from AND gate 23–21 and an additional input extending over lead HE1 from the sequence control corresponds to the "final phase" or end of the advance sequence. An output from AND gate 23–20 indicates a successful check. Thus, the inputs to AND gate 23–20 indicate over lead HE1 that sufficient time has elapsed for all service requests to be transmitted; the second input from AND gate 23–21 indicates test phase 2, and the final input from AND gate 23–26 indicates that all primaries have transmitted service requests. The output from AND gate 23–20 extends through OR gate 23–27 to energize monostable circuit 23–28 and amplifier 23–29.

This output through a group of decoupling diodes 23–30 resets all of the flip-flops used in the synchronism check circuit. In addition to resetting all of these flip-flops, additional outputs are delivered to all of the primary controls to reset the service request flip-flops. For example, flip-flop 20–14 is reset over lead 23–35.

It may be observed that in ordinary operation common control is summoned through a flag indication as explained in the general description. In the synchronism check, however, it is undesirable to summon common control which would then respond to what is a spurious service request. It is necessary therefore to inhibit the usual outputs of the service request flip-flops. Flip-flop 23–22 is ordinarily in the "0" condition at which time amplifier 23–23 is active. AND gate 23–24 combines the output of amplifier 23–23 with that of AND gate 23–21, to produce an output during test phase 2 so long as flip-flop 23–22 is in its normally reset condition. The output of AND gate 23–24 is inverted in inverter 23–25 and a signal is applied to lead ED1 which is multipled to all of the service request AND gates.

Thus, AND gate 20–16 and corresponding AND gates in the other primary controls are inhibited during test phase 2. In consequence, although the output of service request flip-flop 20–14 is permitted to extend to the synchronism check circuit, the connection to common control is blocked.

When amplifier 23–29 resets all of the flip-flops it also terminates test phase 2 over lead 23–36 and the inhibiting potential at AND gate 20–16 is removed to permit forwarding subsequent service requests to the common control by the de-energization of AND gate 23–24.

The purpose of monostable circuit 1–27 is to permit just one service request to be transmitted. Thus the timing cycle of 200 milliseconds is designed to be longer than the longest anticipated scanning cycle but shorter than the shortest anticipated two cycles.

Assuming that one or more primary concentrators failed to transmit a service request, AND gate 23–26 will have a "0" output. In turn, AND gate 23–20 will not be energized. The output of AND gate 23–26 is inverted in inverter 23–31 and presented to AND gate 23–32. AND gate 23–32 has additional inputs designating test phase 2 (lead from AND gate 23–21) and the final phase (lead HE1) of the advance sequence. In this respect AND gate 23–32 reflects the unsuccessful operation of a synchronism check, and AND gate 23–20 indicates successful operation thereof. Flip-flop 23–33 is set by AND gate 23–32 and through amplifier 23–34 applies a signal over lead EH1 which appears as an input to OR gate 21–14 and produces a flag signal for common control. This flag has a high priority position in the scanning cycle of office scanner 25–21.

Thus far it has been indicated to common control that difficulty in the remote concentrators has been experienced. Six unused combinations in the link selection numbers are reserved for maintenance codes as explained in the Harr et al. application. The maintenance codes are transmitted over the same channels used for switching orders. One of these codes arbitrarily resets the counters in the primary concentrator to position 00.

In short, the technique for detecting counters which are out of synchronism includes the request for a synchronism check by a common control as explained above. If the check is successful common control receives no information and in its usual program will return in about 5 seconds to request another check. If the check is unsuccessful, common control must identify the concentrator in difficulty. Flip-flop 23–22 is activated through the control selector over lead JE3, and the input to amplifier 23–23 is removed. In consequence lead ED1 is rendered active over AND gate 23–24 and inverter 23–25 to restore all of the service request gates 20–16 to the normal condition. Common control through the office scanner now scans all of the service request flip-flops and, when it finds a service request flip-flop which is not activated, it infers that the associated primary concentrator is malfunctioning.

Common control formulates an order including a maintenance code to reset the counter as explained in the Harr et al. application. This information is delivered to the remote network control and is transmitted to the primary. When the primary concentrator counter is reset, lead JE1 is activated by the control selector and via OR gate 23–27 energizes monostable 23–28 and amplifier 23–29 to reset all service request flip-flops and synchronism check flip-flops in the manner explained above for a successful check.

A record is made in a special register in common control of the primary counter which has been discovered to be "out of step." On the next synchronism check, common control refers to this register and if it is determined that another failure occurs for the same primary, flip-flop 20–25 is activated over lead JD1 to suppress signals from the primary concentrator concerned. Amplifier 20–26 inhibits AND gates 20–20, 20–24 and 20–16. This action effectively blocks any signals from the remote primary to common control. The output through amplifier 20–27 via OR gate 20–13 sets service request flip-flop 20–14 in order to force the service request flip-flop to the "set" state to generate an apparent (though false) synchronism agreement for later synchronism checks. If this were not done, subsequent tests would again indicate the failure.

If common control had observed a successful synchronism check on the second trial for a remote primary whose number is posted in the special register adverted to above, the information in the register referring to the malfunction of the primary would be deleted.

It may be noted that in certain instances a service request signal may be transmitted in response to a synchronism check but not at the time period expected at the central office. For example, if a primary remote concentrator were in exact synchronism at the time the synchronization check was initiated and subsequently skipped a single slot during the next scan cycle, the spurious service request will be transmitted to the office but will not arrive in time slot 00. Assuming that a position had been skipped in the scan cycle, the spurious service request will arrive one step earlier than time slot 00, i.e., time slot 59. Thus, although the spurious service request is generated, its failure to arrive at the prescribed time sequence indicates a lack of synchronization between the remote counter and the central office counter.

It is understood that the foregoing embodiment is merely illustrative and that various modifications may be made by those skilled in the art without departing from the scope of the invention.

What is claimed is:

1. In a remote concentrator telephone system, a central office, a plurality of line concentrators remotely located from said central office, a group of subscriber lines connected to said line concentrators, a group of trunks connecting said concentrators to said central office, a remote line number counter at each of said line concentrators operable in discrete fashion in accordance with control signals from said central office, a master line number counter at said central office adapted to operate in synchronism with said remote line number counters, and means at said central office for periodically initiating a synchronization check by generating a false service request at each of said remote concentrators having counters in synchronous agreement with said master counter.

2. A remote concentrator telephone system including a central office, a plurality of line concentrators remotely located from said central office, a group of subscriber lines connected to said line concentrators, a group of trunks connecting said concentrators to said central office, a remote line number counter at each of said line concentrators operable in discrete fashion in accordance with control signals from said central office, a master line number counter at said central office adapted to operate in synchronism with said remote line number counters, means at said central office connectable to said concentrators for regularly initiating a synchronization check by generating a false service request indication at each of said remote concentrators having synchronized counters, means at said concentrators for transmitting said service request indications to said central office, and additional means at said central office for examining said service request indications to establish the identification of each remote concentrator that has failed to transmit a service request indication.

3. A remote concentrator telephone system including a central office, a plurality of line concentrators, a group of subscriber lines connected to said concentrators, a plurality of trunks connecting said concentrators to said central office, a line number counter at each of said remote concentrators and a master line number counter at said central office adapted to operate synchronously with said remote counters, means at said central office connectable to said concentrators for periodically initiating a synchronization check including means for stimulating a spurious service request indication at each concentrator having a counter which is operating in synchronism with said master counter, means for transmitting said indications to said central office, means at said central office for examining said service request indications to identify said concentrators which have failed to transmit a service request indication, and additional means at said central office responsive to the failure of transmission of a service request indication by at least one of said remote concentrators to initiate an alarm signal.

4. A remote concentrator telephone system including a central office, a plurality of lines, a plurality of trunks connected to said central office, said trunks being less in number than said lines, concentrator means for connecting said lines to said trunks, a line number counter at each of said concentrators operative to advance in discrete steps in response to control signals from said central office, a reference line number counter at said central office operative in synchronism with said remote counters in response to said control signals, a synchronization check circuit including means at said central office for periodically initiating a synchronization check and for transmitting an interrogation signal to said line concentrators to generate a spurious service request if said counters and said reference counter are in agreement, and additional means at said central office responsive to the transmission of a spurious service request by each of said remote concentrators to normalize said synchronization circuit.

5. In a telephone system, a central office, a plurality of lines, a lesser plurality of trunks connected to said central office, concentrator means for connecting said lines to said trunks, a remote line number counter at each of said concentrators operative in discrete fashion in response to interrogation signals from said central office, a reference line number counter at said central office adapted to operate synchronously with said remote counters in response to said interrogation signals, means at said central office for sequentially initiating a synchronization check of said counters including means for transmitting a control signal to said concentrators to initiate a false service request indication thereat in response to the agreement of said remote counters and said reference counter and the arrival of said control signal, means for transmitting said indications to said control office, and means at said central office responsive to the transmission of service request indications by less than all of said concentrators for formulating reset signals to reset all of said counters to a predetermined count condition.

6. A telephone system including a central office, a plurality of lines, a plurality of trunks less in number than said lines, concentrator switching means for connecting said lines to said trunks, a remote line number counter at each of said concentrators, a local line number counter at said central office adapted to operate synchronously with said remote counters in response to interrogation signals from said central office, means at said central office for intermittently initiating a synchronization check of said counters including means for transmitting control signals to said concentrators, means at said concentrators responsive to said control signals and an agreement between said remote counters and said local counter to transmit a false service request indication to said central office, means at said central office responsive to the reception of false service requests from less than all of said concentrators for identifying the concentrators which have failed to transmit a service request, and additional means in said central office responsive to the failure of transmission of said false service requests for thereafter blocking any additional genuine service requests from said concentrators which have failed to transmit said false service request.

7. A telephone line concentrator system including a central office, a plurality of lines, a plurality of trunks less in number than said lines, concentrator switching means for connecting said lines to said trunks, remote line number counting means at said concentrators operative to advance in discrete steps in response to interrogation signals from said central office, local line number counter means at said central office adapted to operate in synchronism with said remote counters in response to said interrogation signals, means at said central office for initiating a synchronism check of said counters including means for transmitting a check signal to each of said remote concentrators, means at said concentrators responsive to the reception of said check signal and an agreement between said remote counters and said local counter to transmit a spurious service request indication to said central office, means at said central office responsive to the reception of spurious service request indications from less than all of said concentrators for thereafter suppressing legitimate service request indications from said concentrators which have failed to transmit a spurious service request, and means in said concentrators responsive to said suppression for thereafter forcing the generation of a spurious service request in response to subsequent check signals although a lack of synchronism subsists.

8. In a remote telephone line concentrator system in combination, a central office, a plurality of lines, a lesser plurality of trunks connected to said central office, concentrator means for connecting said lines to said trunks, remote line counter means at said remote concentrator, local line counter means at said central office adapted to operate in synchronism with said remote mounter in response to interrogation signals from said central office, means at said central office for initiating a synchronism check including means for transmitting a synchronization check pulse to each of said concentrators, a monostable timer circuit at said concentrators, means at said concentrator responsive to said check pulse and a predetermined count in said remote counter equal to the count in said local counter for energizing said monostable circuit to generate a spurious service request indication for transmission to said control office, and means at said central office responsive to the lack of reception of a spurious service request indication from said concentrator for generating an alarm condition.

9. In a telephone system, a central office, a plurality of lines, a plurality of trunks less in number than said lines, remote concentrator means for connecting said lines to said trunks, scanning means at said concentrator having a plurality of terminals connected to said lines for cyclically determining the state condition of said lines, remote counter means at said concentrator operable to advance in discrete steps in response to interrogation signals from said central office, a master line counter at said central office operative in synchronism with said remote counter in response to said interrogation signals, means for advancing said scanning means in a discrete fashion in conjunction with said remote counter means, means in said central office for transmitting a synchronization signal to said remote counter means, and means at said remote concentrator responsive to the reception of said synchronization signal and the scanning of a predetermined terminal by said scanner to generate a spurious service request.

10. In a remote line concentrator system in combination, a plurality of subscriber lines, a lesser plurality of trunks connected to a central office, concentrators under control of said central office for connecting said lines to said trunks, cyclically operated counters at said remote concentrator and at said central office, means for advancing said counters in a discrete fashion in response to interrogation signals from said central office, means at said central office for delivering a synchronization check signal to said remote counter, and means at said remote counter responsive to the reception of said synchronization signal for initiating a spurious service request indication if said remote counter is at a predetermined position when said synchronization signal is received.

11. A remote line concentrator system in accordance with claim 10 including additional means in said remote concentrator for transmitting said spurious service request to said central office on the next full cycle of said remote counter.

12. A telephone system including a plurality of subscriber lines, a central office, a plurality of trunks less in number than said lines connected to said central office, a group of remote concentrators under control of said central office for connecting said lines to said trunks, remote counter means in said remote concentrators cyclically operable in response to signals from said central office to advance in discrete fashion, central office counter means adapted to operate in synchronism with said remote counter means, means at said central office for transmitting a synchronization check pulse to all of said remote concentrators, means at said remote concentrators responsive to the arrival of said synchronization pulse and the agreement of said remote counter with said central office counter to transmit a spurious service request to said central office, and means in said central office responsive to the lack of transmission of spurious service requests from all of said remote concentrators for actuating an alarm condition.

13. A remote concentrator telephone system including a central office, a plurality of subscriber lines, a plurality of trunks less in number than said lines connected to said central office, a plurality of remote concentrators for connecting said lines to said trunks, remote counting means at said concentrators adapted to operate in discrete fashion in response to advance pulses transmitted from said central office, central office counting means adapted to operate synchronously with said remote counting means, means at said central office for transmitting a synchronization check signal to said remote concentrators, means at said concentrators responsive to the reception of a synchronization signal and the advance of said remote counting means to a predetermined position to generate a false service request indication, service request indicating facilities at said central office operative in response to said false service requests, and means at said central office responsive to the reception of false service request indications from less than all of said remote concentrators for resetting all of said service request indicating facilities.

14. A remote line concentrator system including a central office, a plurality of subscriber lines, a plurality of trunks less in number than said lines connected to said central office, a plurality of remote concentrators for connecting said lines to said trunks, remote counting means at said remote concentrators adapted to operate in cyclical order in response to advance signals from said central office, counting means at said central office adapted to operate in synchronism with said remote counting means, scanning means at said remote concentrators responsive to said advance signals and adapted to advance in fixed time relation in conjunction with said remote counter, means at said central office for transmitting a synchronization check signal to said remote concentrators, means at said remote concentrators responsive to the reception of said synchronization check signal and the agreement of said remote and central office counters for preparing a spurious service request indication, means for thereafter advancing said scanning means through a complete cycle to observe and transmit said service request indication, and means at said central office responsive to the reception of said service request indication to indicate a successful synchronization check.

15. In a remote concentrator telephone system, a central office, a plurality of trunks connected to said central office, a greater plurality of links, a still greater plurality of subscriber lines, primary concentrator means for connecting said trunks to said links, secondary concentrator means for connecting said links to said lines, a remote line number counter at each of said primary concentrator means operable in discrete steps in accordance with advance signals from said central office, a master line number counter at said central office adapted to operate in synchronism with said remote line number counters, means at said central office for intermittently transmitting a synchronization check signal to said primary concentrator means, and means at each of said remote primary concentrators for generating a spurious service request in response to the arrival of said check signal and a disparity between said remote counter and said central office counter.

16. A remote telephone line concentrator including a central office, a plurality of trunks connected to said central office, a plurality of links greater in number than said trunks, a plurality of lines greater in number than said links, remote primary concentrator means for connecting said lines to said links, secondary concentrator means for connecting said links to said trunks, scanning means at said primary concentrator for cyclically determining the state condition of said lines and links, a remote line counter at said primary concentrator means operable in discrete fashion in response to advance signals from said central office, a master line number counter at said central office operative in synchronism with said remote line counter in response to said advance signals, said scanning means being operative is discrete steps in conjunction with said remote line counter and one cycle in advance of said counter, means in said central office for transmitting a synchronization signal to said remote line counters, and means at said remote primary concentrators responsive to the reception of said synchronization signal and the scanning of a predetermined line number by said scanning means to generate a spurious service request.

17. In a telephone system, a central office, a plurality of trunks connected to said office, a plurality of links less in number than said trunks, a plurality of lines less in number than said links, primary concentrator means for connecting said lines to said links, secondary concentrator means for connecting said links to said trunks, scanning means at said primary concentrator for cyclically determining the state condition of said lines and links, remote counter means at said primary concentrator means operable in discrete fashion in response to advance signals from said central office to sequentially register the number designations of said lines, a master counter at said central office operative in synchronism with said remote counter in response to said advance signals, means for advancing said line scanner in response to said advance signals, said line number counter at said remote concentrator and said scanning means being operatively related in order that said scanning means examine a particular line one cycle in advance of the particular line number count being registered in said remote counter means, means at said central office for intermittently transmitting a synchronization check pulse to said primary concentrator means, means at said primary concentrator responsive to said check pulse and an agreement between said remote counter and said central office counter for preparing a false service request indication, and additional means in said remote primary concentrator responsive to the completion of a full counting cycle after the arrival of said check pulse and the scanning of a predetermined line number by said scanner for transmitting said false service request indication to said central office.

18. In a telephone system, a central office, a plurality of trunks connected to said central office, a plurality of links less in number than said trunks, a plurality of lines less in number than said links, remote primary concentrator means for connecting said lines to said links, remote secondary concentrator means for connecting said links to said trunks, remote counting means at said primary concentrator responsive to advance signals from said central office for operation in discrete fashion to sequentially indicate the number designations of said lines, scanning means at said primary concentrator responsive to said advance signals for examining the state condition of said lines, counting means at said central office adapted to operate in synchronism with said remote counting means in response to said advance signals, means for operating said scanning means in synchronism with said remote counting means and one step in advance thereof, means at said central office for periodically transmitting a synchronization check signal to said remote primary concentrator, means at said primary concentrator responsive to the reception of said check signal and the indication by said remote counting means of a predetermined number in agreement with said central office counting means for preparing a false service request, and additional means at said remote primary concentrator responsive to the advance of said scanning means to said predetermined number for generating a false service request and transmitting said request to said central office.

19. In a telephone system, a central office, a plurality of trunks connected to said central office, a plurality of links less in number than said trunks, a plurality of lines less in number than said links, remote primary concentrator means for connecting said lines to said links, remote secondary concentrator means for connecting said links to said trunks, counting means at said primary concentrator and counting means at said central office adapted to operate synchronously in response to advance signals initiated at said central office, means at said central office for intermittently transmitting a synchronization check signal to said remote primary concentrator, means at said primary concentrator responsive to the arrival of said signal and a match condition between said counting means for transmitting a false service request indication to said central office, service request indicating means at said central office operative in response to the reception of said false service request to indicate a service request condition as a successful synchronization check, and means at said central office for resetting said service request indicating means.

20. In a telephone system, a central office, a plurality of trunks connected to said office, a plurality of links less in number than said trunks, a plurality of lines less in number than said links, remote primary concentrators for connecting said lines to said links, remote secondary concentrator means for connecting said links to said trunks, counting means at each of said remote primary concentrators, counting means at said central office, said counting means being adapted to operate synchronously in accordance with advance signals from said central office, means at said central office for intermittently transmitting a synchronization check signal to each of said remote primary concentrators, means at said remote concentrators responsive to the arrival of said check signal and an agreement between said counting means for generating a false service request, means at said central office individual to each of said remote primary concentrators and responsive to the arrival of a false service request therefrom for indicating a service request condition as a successful synchronization check, alarm indicating means, and means at said central office responsive to the arrival of a false service request from less than all of said remote primary concentrators and the operation of less than all of said service request indicating means for operating said alarm indicating means.

21. A telephone system in accordance with claim 20 including in addition means in said central office connected to said service request indicating means for identifying which of said remote primaries has failed to generate and transmit a false service request.

22. A telephone system in accordance with claim 21 including additional means in said central office responsive to the arrival of a service request signal from less than all of said remote primary concentrators and the operation of less than all of said service request indicating means for recording the identification of any remote primary concentrator failing to transmit a false service request indication.

23. A telephone system in accordance with claim 22 including in addition means in said central office responsive to the operation of all of said service request indicating means in response to a subsequent synchronization check signal for deleting the identification of the primary concentrator previously recorded as having failed.

24. A telephone system in accordance with claim 23 including in addition means in said central office for setting said service request indicating means of said remote primary concentrator which has failed to transmit a false service request into a condition representing the successful arrival of said false service request to thereafter generate an apparent successful synchronism check.

25. An automatic telephone system including a central office, a plurality of trunks connected to said office, a plurality of links less in number than said trunks, a plurality of lines less in number than said links, primary concentrators for connecting said lines to said links, secondary concentrator means for connecting said links to said trunks, remote counting means at each of said remote primary concentrators operable in discrete fashion in response to advance signals from said central office to sequentially register the number designations of said lines, counting means at said central office operative in synchronism with said remote counting means, means at said central office for periodically transmitting a synchronization check signal to said secondary concentrator means and in broadcast form therefrom over said links to all of said primary concentrators, and means at said primary concentrators responsive to the arrival of said synchronization check signal and a match condition between said remote counting means and said central office counting means for generating a false service request signal.

26. An automatic telephone switching system including a central office, a plurality of trunks connected to said office, a plurality of links less in number than said trunks, a plurality of lines less in number than said links, remote primary concentrators for connecting said lines to said links, secondary concentrator means for connecting said links to said trunks, remote counting means at said remote primary concentrators operable in discrete steps in response to advance signals from said central office to sequentially register the number designation of said lines, counting means at said central office adapted to operate in synchronism with said remote counting means, means at said central office for periodically transmitting a synchronization check signal to each of said primary concentrators, a monostable circuit at said primary concentrators, means at said primary concentrators responsive to the arrival of said synchronization check signal and a match condition between said remote counting means and said central office counting means for energizing said monostable circuit, scanning means at said primary concentrators having a plurality of terminals for examining the service condition of said lines, and means at said primary concentrators responsive to the energization of said monostable circuit and the scanning of a particular terminal by said scanning means for transmitting a false service request indication to said central office.

27. An automatic telephone switching system in accordance with claim 26 including in addition means at said primary concentrator for energizing said monostable circuit for a time period in excess of the time required to traverse a full counting cycle but less than two counting cycles.

28. In a telephone system, a central office, a plurality of trunks connected to said office, a plurality of links less in number than said trunks, a plurality of lines less in number than said links, primary concentrators for connecting said lines to said links, secondary concentrator means for connecting said links to said trunks, remote counters at said primary concentrators operable in cyclical fashion in response to advance signals from said central office to sequentially indicate the number designation of said lines, each of said designations also representing a particular time division, counting means at said central office adapted to operate in synchronism with said remote counters, scanning means at said primary concentrators having a plurality of terminals to be scanned representing said time divisions and adapted to operate in synchronism with said remote counters and one cycle in advance thereof, means at said central office for intermittently transmitting a synchronization check signal to said concentrators, a monostable circuit at said primary concentrators, means at said primary concentrators responsive to the arrival of said check signal and a match condition between said counting means at a predetermined time division when said scanning means is examining a terminal assigned to a different time division for energizing said monostable circuit to prepare a false service request, and additional means in said concentrator responsive to the advance of said scanning means to said terminal representing said predetermined time division for transmitting said false service request to said central office.

No references cited.